United States Patent [19]

Smith et al.

[11] 4,054,846

[45] Oct. 18, 1977

[54] TRANSVERSE-EXCITATION LASER WITH PREIONIZATION

[75] Inventors: Peter William Smith, Colts Neck, N.J.; Obert Reeves Wood, II, New York, N.Y.

[73] Assignee: Bell Telephone Laboratories, Incorporated, Murray Hill, N.J.

[21] Appl. No.: 692,657

[22] Filed: June 4, 1976

Related U.S. Application Data

[63] Continuation-in-part of Ser. No. 564,621, April 2, 1975, abandoned.

[51] Int. Cl.$^2$ .............................................. H01S 3/22
[52] U.S. Cl. ............................ 331/94.5 G; 313/231.4; 315/111.2
[58] Field of Search .................. 331/94.5 P, 94.5 PE, 331/94.5 G, 94.5 C; 313/231.3, 231.4, 231.7; 315/111.2; 330/4.3

[56] References Cited

U.S. PATENT DOCUMENTS

| 3,815,047 | 6/1974 | Smith et al. ...................... 331/94.5 C |
| 3,842,365 | 10/1974 | Hundstad et al. ............ 331/94.5 PE |

OTHER PUBLICATIONS

Schriever, R. L., Applied Physics Letters, May 1972, pp. 354–356.

Cohn et al., Applied Physics Letters, vol. 22, No. 4, Feb. 15, 1973, pp. 138–140.
Morrison et al., Physics Letters, vol. 40A, No. 5, Aug. 14, 1972, pp. 375–377.
Malter, L., Physical Review, vol. 50, July 1, 1936, pp. 48–58.

*Primary Examiner*—William L. Sikes
*Assistant Examiner*—Marcus S. Rasco
*Attorney, Agent, or Firm*—Arthur J. Torsiglieri

[57] ABSTRACT

Preionization is achieved in transverse-discharge gaseous lasers by means of the Malter effect. In two embodiments, the preionization is achieved either with a metal electrode which is the cathode during preionization and then is the anode during the subsequent pumping phase, or by means of a separate set of preionization electrodes. These preionization cathodes are metal electrodes, such as aluminum or tantalum electrodes, exhibiting high secondary electron emission by the Malter effect. High-field electron emission from these preionization cathodes is inherently possible because of a thin insulating layer on the surface. This layer separates positive ions attracted to the surface from the conducting metal and thereby creates a very high field gradient over a very short distance. In a preferred embodiment, uniform initial ionization is created during the preionization phase of operation; and the excitation is supplied by an electric field which is lower than that required to sustain the discharge; and the active medium is enclosed in an optical waveguide free of interfering structure.

20 Claims, 5 Drawing Figures

INPUT ENERGY PER UNIT VOLUME VERSUS IONIZING VOLTAGE

4,054,846

TRANSVERSE-EXCITATION LASER WITH PREIONIZATION

CROSS REFERENCE TO RELATED APPLICATION

This application is a continuation-in-part of our co-pending application, Ser. No. 564,621, filed Apr. 2, 1975, now abandoned.

BACKGROUND OF THE INVENTION

This invention relates to gas lasers of the transversely-excited type.

In the development of transverse-excitation lasers, many of which operate at or near atmospheric pressure and thereby permit generation of substantial volumetric output power, a variety of techniques have been developed in an attempt to assure predictable, repeatable operation of the laser. These techniques are directed to the problem that at the start of a pulse in a transverse-excitation laser the medium may not break down uniformly, but may develop arcs at various locations in the transverse discharge.

Another problem common to many high-pressure molecular gas lasers is that the optimum field for excitation is lower than that required to break down the gas to create the discharge.

One technique used to overcome these problems has been to preionize the medium with an electron beam generated externally and injected into the laser-active medium. This technique is commonly described as the E-beam technique.

The other, more commonly used, technique makes use of ultraviolet radiation to preionize the laser medium. The ultraviolet radiation may result from a preliminary discharge of some type, for example, a small arc discharge from one or more trigger electrodes, or may be ultraviolet radiation from some external source.

Both of the foregoing techniques have advantages and drawbacks. The E-beam technique is much more easily extended to large, high power, high pressure lasers than the ultraviolet preionization techniques but it is also much more cumbersome and less attractive for most commercial applications.

A need clearly exists for a technique as simple and compact as the ultraviolet preionization technique but which also has the reliability and possibility of extension to higher operating pressures and output powers, such as is characteristic of the E-beam technique.

SUMMARY OF THE INVENTION

According to our invention, we have discovered that the above-stated need can be satisfied by a preionization technique employing a thin film field-emission effect, sometimes termed the Malter effect. The Malter effect is a physical effect previously observed in the use of certain metal cathodes in other types of devices and typically depends on high-field efficient secondary emission of electrons from the metal as a result of positive ions collected on the surface of an appropriately thin insulating layer that is formed on the surface of the metal. While it is known from many sources that certain metal electrodes can be used as fairly effective cold cathodes because of the Malter effect, their unique advantages for preionization in transverse-excitation lasers have never heretofore been appreciated. In fact, the characteristic of the Malter effect for preionization which we have discovered is its ability to create uniform volumetric ionization, thereby permitting subsequent creation of a uniform discharge even with an electric field lower than that required to break down the gas. Yet very little added structural complication, as compared to non-E-beam transversely-excited lasers, is needed for the application of the Malter effect. Indeed, simple adaptations of our transverse-excitation laser, disclosed in our U.S. Pat. No. 3,815,047, issued June 4, 1974, are sufficient for application of the Malter effect preionization in a transversely-excited gas laser. Other features of our invention relate to the adaptation of the initial discharge establishing means in such a laser with respect to the discharge sustaining or pumping means in order to take optimum advantage of the Malter effect. Indeed, we have discovered that at a sufficiently high value of repetition rate of the preionization pulses, essentially continuous-wave operation of the laser is obtained.

In the preferred embodiment of our invention the roles of the preionization electrodes are reversed from the preionization phase to the pumping phase of operation to permit better power dissipation; whereas in another embodiment a separate group of preionization electrodes are employed. In either case, the preionization cathodes can be aluminum, tantalum or other materials exhibiting the Malter effect and the insulating layer may be an oxide of the metal or a deposited insulator such as magnesium oxide. The layer should be sufficiently thin to permit tunneling of electrons therethrough but sufficiently thick to avoid surface erosion under the impact of bombarding positive ions. Suitable thicknesses are typically between 100 Angstroms and 500 Angstroms.

In addition, embodiments of the invention are characterized by being free of any other preionization technique such as photoionization or electron beam ionization. The freedom from other preionization means permits a simple compact structure in which the cathode and anode members together with side wall spaces form an efficient waveguiding structure which is free of any additional electrodes and, accordingly, free of the complexities such electrodes would add.

BRIEF DESCRIPTION OF THE DRAWING

Further features and advantages of our invention will become apparent from the following detailed description taken together with the drawing in which.

DESCRIPTION OF ILLUSTRATIVE EMBODIMENT

Figure 1:
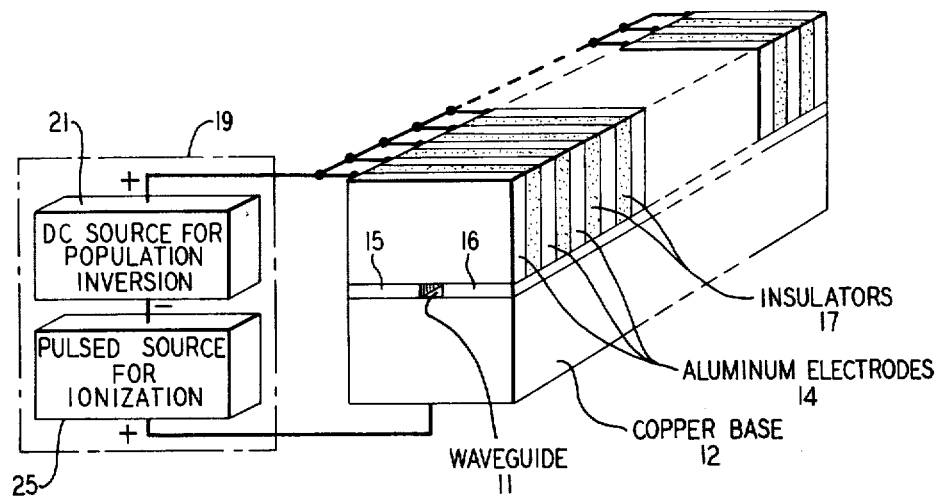
FIG. 1 is a partially pictorial and partially block diagrammatic illustration of a first embodiment of our invention.

In the embodiment of FIG. 1, laser action was obtained in a mixture of carbon dioxide, nitrogen and helium in a rectangular cross-section waveguide 11 formed by a copper base 12, side walls 15 and 16 of quartz and a top wall comprising alternate fused quartz segments 17 and aluminum segments 14. This composite structure of dielectric material and metal permits the establishment uniformly of transverse discharges in the gaseous mixture within waveguide 11. The surface of the aluminum segments exposed to the waveguide is provided with an insulating layer as will be discussed in more detail below.

The copper base electrode 12 was polished to be highly smooth and planar within waveguide 11. The interior edges of fused quartz slabs 15 and 16 were also highly polished to be parallel to each other and to be orthogonal to the plane of the copper base 12. The segments 14 and 17 comprising the top wall advantageously have a mutually planar surface parallel to the opposed surface of copper base 12.

The various continuous wall surfaces cooperate to form a continuous smooth waveguide which confines the stimulated emission and guides it along the optical axis with a consequent high degree of transmission efficiency.

Additionally, by this construction, the waveguiding passage is advantageously free of any additional electrodes that could constitute obstructions to the free flow of wave energy.

Finally, the gaseous mixture is made to flow longitudinally along the optical axis of the structure by appropriate inlet and outlet openings (not shown) at opposite ends of the base 12 to provide minimum interference with the waveguiding role of the walls.

Excitation is applied to the gas mixture in waveguide 11 from a composite excitation source 19 including in series the pulse source 25 for preionization of the gas mixture and the source 21 for producing a sustained population inversion in the mixture.

In one design, source 25 supplies a train of 20 nsec duration high-voltage pulses of about 4 KV to 8 KV peak amplitude between the copper base 12 and the aluminum segments 14, illustratively at a repetition rate of about 5 kHz. We have also successfully operated the laser from lower repetition rates up to a rate of about 10 kHz. These pulses are applied in a polarity which is positive toward the copper base 12 so that the aluminum segments 14 act as cathodes and the copper block 12 acts as an anode during the application of these pulses. The pulses thereby increase the electron density from a low initial value, which is left over from the previous pulse, to a high peak value in the range from $1 \times 10^{12}$ per cubic centimeter to about $3 \times 10^{12}$ per cubic centimeter. After the termination of each pulse from source 25 the field polarity applied between copper base 12 and segments 14 is reversed because DC source 21 is connected in a polarity which is positive toward the aluminum segments 14 so that they act as anodes during the sustained pumping. This reversal in roles proves advantageous because the relatively bulkier copper base is better adapted to serve as the cathode and so to dissipate heat during the sustained pumping when most of the heat is being generated. The value of DC voltage is typically made adjustable from 560 to 640 volts to produce a field gradient per unit pressure (E/P) in waveguide 11 which varies from 3.5 to 6.5 volts/centimeter-Torr.

Most of the 560–640 volts from source 21 is necessary to overcome the normal cathode fall voltage at the copper cathode, so that the actual effective sustaining voltage across waveguide 11 after preionization is complete, is about 60–90 volts, positive toward the aluminum segments 14.

In a typical design the transverse dimension of waveguide 11 between copper base 12 and aluminum segments 14 is 1 mm. The transverse dimension between the quartz dielectric spacers 15 and 16 is also 1 mm, and each of the aluminum and quartz segments is 1 mm thick. There is accordingly formed a waveguide of square cross-section. The length of the waveguide is about 12.5 cms in this design.

Reflectors (not shown in FIG. 1) are also provided at each end of waveguide 11, or distributed feedback perturbations can be provided along the waveguide walls in order to stimulate the coherent emission of radiation. Illustrative distributed feedback could be undulations in the top and bottom wall surfaces at a multiple of half-wavelengths of the expected coherent radiation.

In operation, the high level of preionization achieved by pulse source 25 is thought to result from a combination of efficient secondary emission from the aluminum preionization cathodes 14 via the Malter effect and also electron multiplication due to the high electric fields present. The resulting ionization is sufficiently effective that the small effective sustaining field provides the optimum electron energy needed to excite nitrogen and carbon dioxide molecules vibrationally during the sustained pumping phase of operation. Although the sustaining field may eventually allow the discharge to go out, it provides energy loadings from about 50 to about 500 Joules per literatmosphere without arc breakdown. The resulting values of peak gain at 10.6 $\mu$m are from 1.2 percent centimeter to about 6.6 percent centimeter.

The gain rises to the latter peak value some 70 microseconds after the start of the ionizing pulse and has an overall duration of about 150 microseconds in an illustrative case. Hence, at repetition frequencies of 5–10 kHz for source 25, continuous gain can be obtained from the laser of FIG. 1.

Figure 3:
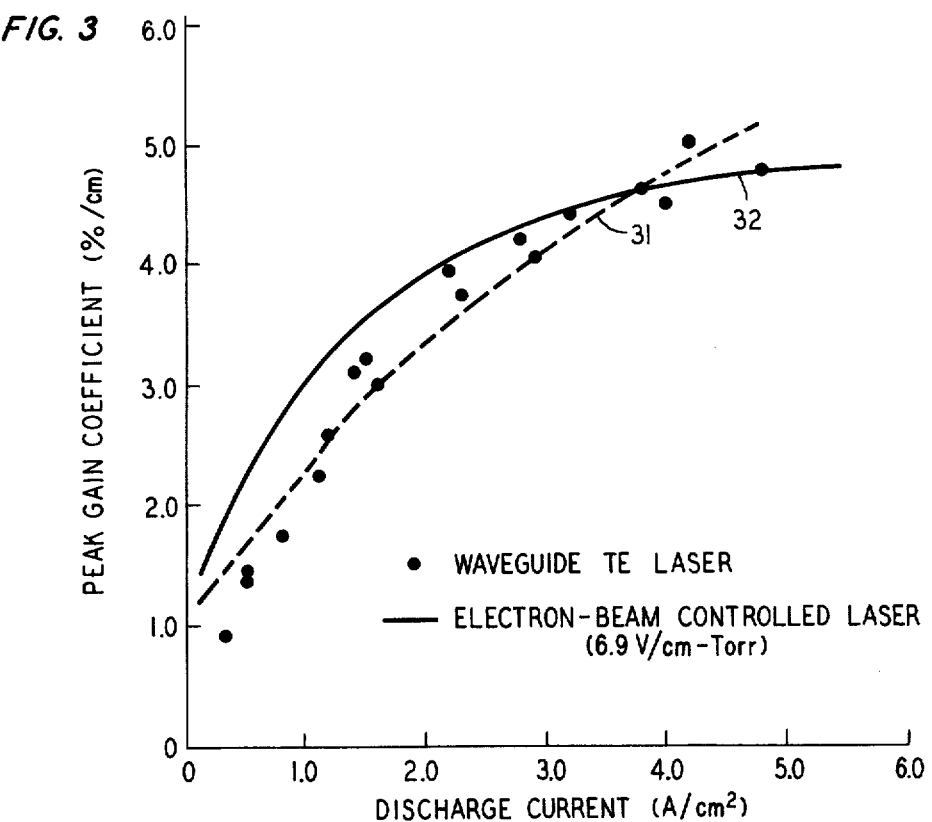
FIG. 3 shows curves which compare the operating characteristics of our invention with a device employing an E-beam controlled discharge preionization technique.

A comparison of the peak gain coefficient versus electric field gradient per unit pressure for the device of FIG. 1 and for an analogous electron-beam-controlled discharge is shown by the curves of FIG. 3. Curve 31 represents the performance of the laser of FIG. 1 and can be seen to be essentially a straight line through the data which are shown as varius ranges of electric field gradient per unit pressure at each measured value of peak gain coefficient. Curve 32 represents results which have been previously obtained for an electron-beam-controlled device. That is, for curve 32, ionization of the gaseous medium was achieved by an injected electron beam in a transverse-excitation laser having a gaseous medium of 580 Torr pressure, with the proportions of helium to nitrogen to carbon dioxide being 3/1/1. It will be noted that curve 31 shows that the new laser for FIG. 1 extends operation more easily to higher peak gain coefficients than for the E-beam device, given like values of electric field gradient per unit pressure. This startling improvement of performance is achieved with relatively easily accomplished modification of the laser of our above-cited U.S. Pat. No. 3,815,047.

It is also a noteworthy characteristic of the present invention that even at very high gas pressures, quite uniform discharges can be obtained by our invention. We believe that such uniformity will extend to pressures much higher so long as the Malter effect is made to produce preionization throughout substantially the whole volume of the active medium. We have, in fact, operated successfully with total operating pressures between 100 and 760 Torr. There is some indication that as the pressure increases the discharge tends not to be uniform across the full width of the waveguide, but tends to concentrate along the side walls. This tendency can be compensated for by localizing the segments 14 to the center of the waveguide rather than extending the full width of the guide and using quartz segments as fillers on both sides of the segments to complete the enclosure.

Higher pressures for the gas medium typically result in line broadening which makes possible tuning of the emission over a wider wavelength range.

Figure 4:
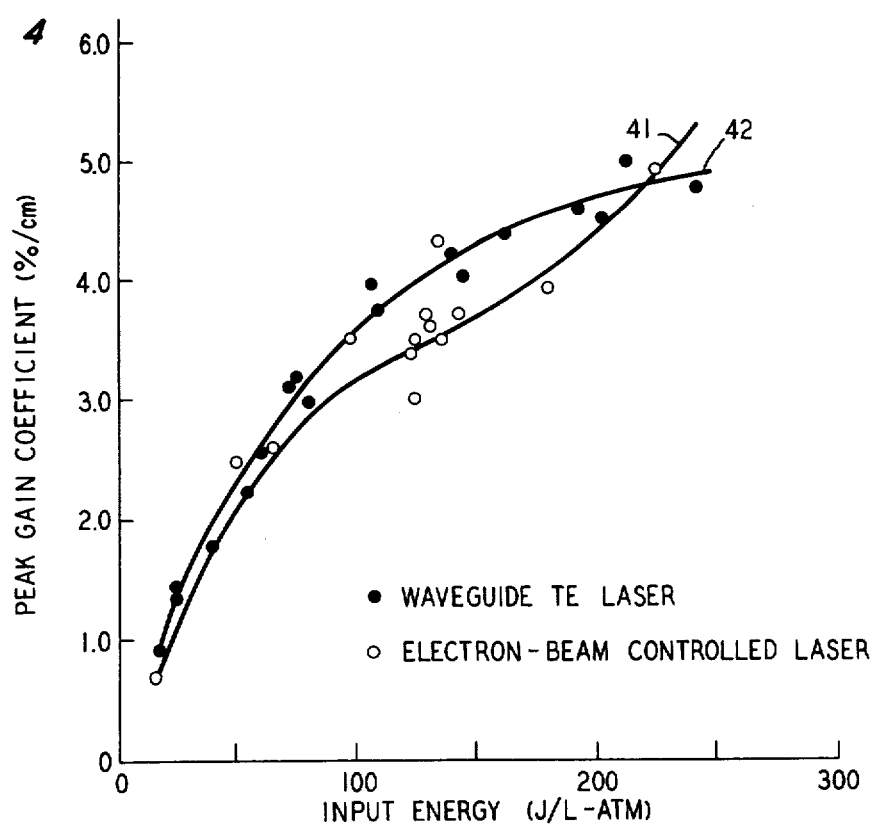
FIGS. 4 and 5 show curves which are useful in explaining the operation of our invention.

The curves of FIG. 4 show the variation in peak gain coefficient in percent per centimeter for variations in the total input energy of each pumping cycle. Here the uncertainty in the data points of FIG. 3 is transferred into a horizontal separation between the curves 41 and 42, the region between them being the operating region of the laser. The input energy is given by either of two values: Joules per liter for the entire mixture of Joules per liter per atmosphere. An exact one-to-one correspondence between these measures of input energy can be set up because in the example of FIG. 4 a fixed total pressure of 145 Torr was used and the mixture ratio of helium to nitrogen to carbon dioxide was 6/0.6/1.

Figure 5:
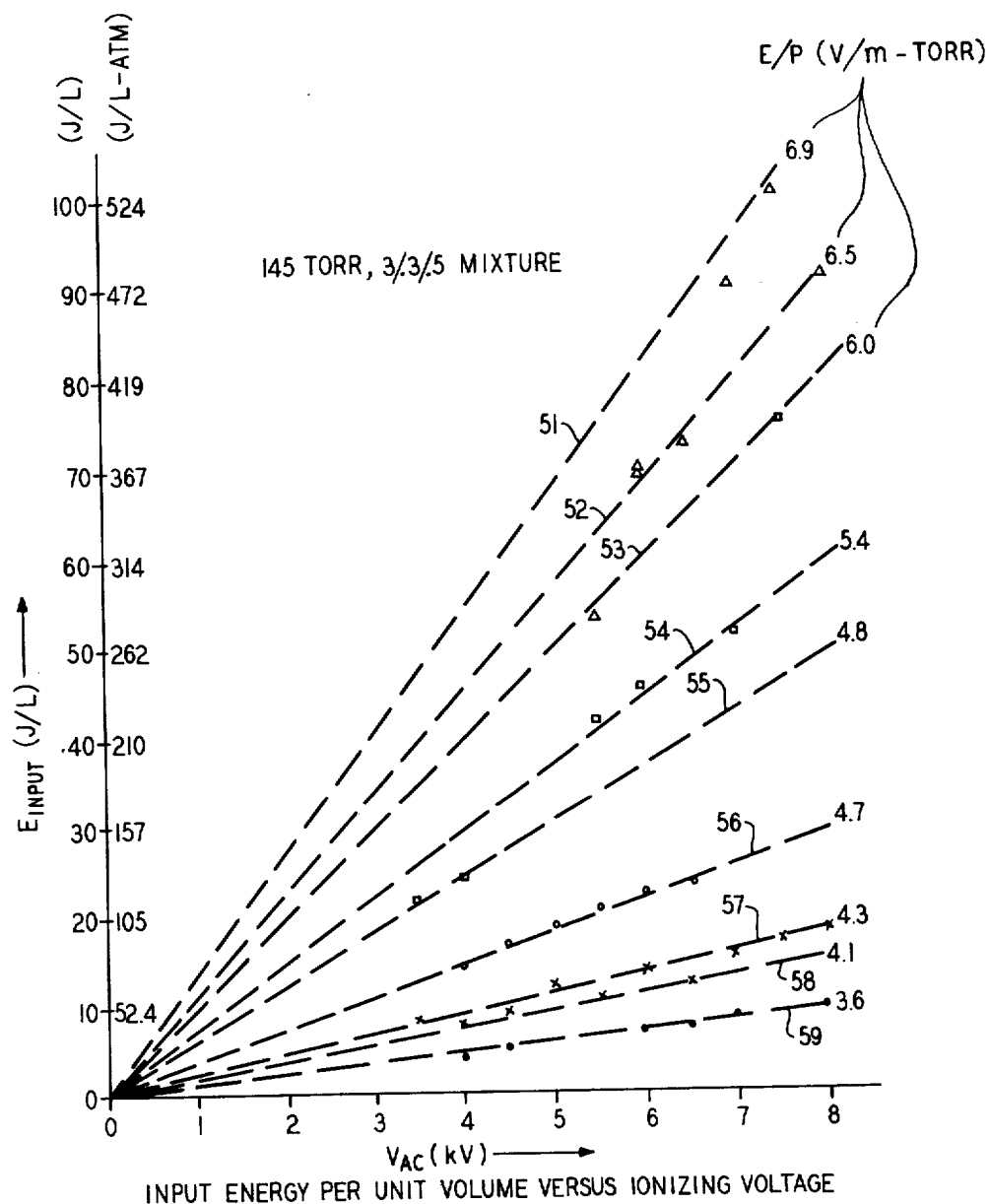

Another set of interesting characteristics of the laser of FIG. 1 is shown in FIG. 5 which shows the input energy per unit volume versus the ionizing voltage supplied from source 25. Each of the curves 51 through 59 is for a different value of electric field gradient per unit pressure; but, in all cases, the same gas mixture is employed as for FIG. 4. It is believed that those operating characteristics illustrated in curves 51 through 59 illustrate how completely the overall operation of the laser can be determined by the preionization phase of operation when the sustaining phase of the pumping cycle is sufficiently mild so as not to degrade the active medium or at least when that sustaining phase allows the discharge phase gradually to go out.

It is found that the efficiency and stability of this field emission is a function both of the metal of segments 14 and the thickness and choice of the thin insulating film on its surface. In particular, for stability over extended use, it appears important to avoid too thin layers because the discharge tends to cause some erosion of the film, and if the film is too thin to tolerate erosion its effectiveness falls with use. For example, for deposited aluminum oxide on aluminum, the initial efficiency seems to be highest for thicknesses about 200 Angstroms. This efficiency decreases with increasing use and it is believed that thicker thicknesses are desirable where long life, high power operation is the prime consideration. In such a case a thickness of between 300 Angstroms and 500 Angstroms is believed more suitable. For deposited films it has been found that magnesium dioxide seems to withstand erosion better than aluminum oxide; and although its efficiency is lower, if this is secondary to life and stability, its use appears preferable to aluminum oxide for either aluminum or tantalum segments. In such instances, thicknesses of about 100 Angstroms – 200 Angstroms appear to be the most advantageous. It can be expected that native or genetic oxides grown by conversion of the metal, either by thermal oxidation or anodization, should have some advantages, such as, some self-healing properties. In particular, there is some indication that a particularly suitable cathode would comprise a tantalum member, the active surface of which has been anodized to form an oxide film of at least 100 Angstroms and as much as 500 Angstroms thickness. It does appear important for usefully long life with the materials tried to employ a layer thickness significantly thicker than is formed naturally on the metal in the absence of any unusual treatment. In particular, such natural layers tend to be less than 50 Angstroms thick, and it appears important to practical devices that the thickness be at least 50 Angstroms and advantageously at least 100 Angstroms thick. Thick layers tend to require high advantageous to employ thicknesses below 500 Angstroms.

While primary emphasis has been put in our work hitherto on the use of aluminum and tantalum as the base metal, and their oxides and magnesium oxide as the insulating layer, other combinations should prove feasible.

Figure 2:
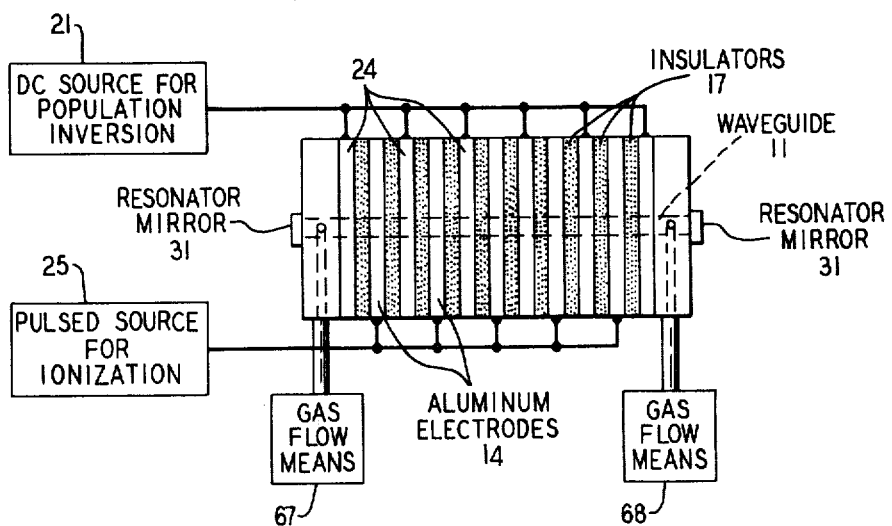
FIG. 2 is a partially pictorial and partially block diagrammatic illustration of a second embodiment of our invention.

An alternative embodiment of the invention is shown in FIG. 2 and serves to establish the principle that the preionization function in such a laser can be distinct from that of the sustained phase of pumping and indeed can use a separate set of electodes. In addition, the embodiment of FIG. 2 shows the inlet gas flow means 67 and the exhaust gas flow means 68 which would also typically be used with the embodiment of FIG. 1. Similarly, the resonant cavity mirrors 31 would also typically be used with the embodiment in FIG. 1. These mirrors 31 are typically dielectric coated germanium or zinc selenide mirrors.

The embodiment of FIG. 2 differs from that of FIG. 1 in that one set 24 of half of the metallic electrode segments are connected to the pulsed preionization source 25, and the other set 26 of half the metallic electrode segments are connected to the d-c sustaining source 21, with segments of the two sets being interleaved with one another and the insulating segments 17.

In this embodiment, the set of electrodes 24 serves as the cathodes to the anode base member to preionize the medium during the preionization pulse while the set of electrodes 26 serves as the anode to the cathode base member during the sustaining portion of the cycle. If desired, the sustaining voltage could be switched off during the preionization pulse. Moreover, in this embodiment, it might be desirable in some instances to have one set of electrodes recessed with respect to the waveguiding surface formed by the other set and the insulating members 17. This might prove useful, for example, if it was found that the exposed surfaces of the cathode set suffered damage and became rough as a result of ion bombardment and, accordingly, it became desirable to minimize the waveguiding role of such surfaces.

In operation, the characteristics of the laser of FIG. 2 are much the same as that of FIG. 1 except for the reduced number of preionization cathodes 14. Any tendency for reduction in the uniformity of the initial discharge can be minimized by reducing the axial width or thickness of the segments to achieve the same overall results as in the embodiment of FIG. 1. Any suitable metal exhibiting the Malter effect may be used for electrodes 24 as described for the embodiment of FIG. 1. However, in this embodiment, it becomes unnecessary that the set of anode segments 26 be of a Malter effect material.

It is to be understood that the specific embodiments described are merely illustrative of the general principles of the invention and that various other embodiments may readily be devised without departing from the spirit and scope of the invention. For example, there may be substituted various other mediums suitable for use in a transverse excitation laser, such as carbon monoxide or nitrous oxide with auxiliary gases such as helium. Additionally, it may be feasible, at some sacrifice in the uniformity of the discharge, to substitute for the segmented cathode a solid cathode member of an appropriate material as discussed.

For a more detailed description of embodiments of the invention, reference is made to an article appearing in *Applied Physics Letters*, Vol. 27, No. 10, pages 539-541 (Nov. 15, 1975) entitled "Excitation of Transversely Excited $CO_2$ Waveguide Lasers," by O. R. Wood II, P. W. Smith, C. R. Adams and P. J. Maloney.

What is claimed is;

1. A transverse excitation laser comprising
   means defining an optical axis along which the laser light propagates,
   cathode and anode electrode means positioned in opposed relationship along said optical axis for establishing therealong a transverse electric field,
   insulating side wall members forming with said cathode and anode means a waveguide for the laser light,
   means for flowing a gaseous medium in said waveguide in the transverse electric field, and
   means for exciting said medium to produce a population inversion therein and to stimulate the desired emission of radiation;
   characterized in that: the cathode means includes means for preionizing said medium via the Malter effect; the exciting means includes means for applying a relatively higher voltage pulse between the opposed cathode and anode electrode means for preionizing said medium within said waveguide, and means for applying a relatively lower voltage between opposed electrode means for sustaining a discharge in the medium within the waveguide; and the waveguide is free of other preionization means.

2. A laser in accordance with claim 1 in which the cathode means comprises a metal base member and a thin surface layer of an insulating material.

3. A laser in accordance with claim 2 in which the metal base is of a material taken from the group consisting of aluminum, magnesium and tantalum.

4. A laser in accordance with claim 2 in which the insulating layer is taken from the group consisting of aluminum oxide, magnesium oxide and tantalum oxide.

5. A laser in accordance with claim 4 in which the layer is at least 100 Angstroms thick.

6. A laser in accordance with claim 2 in which the metal is aluminum, and the layer is of aluminum oxide and at least 100 Angstroms thick.

7. A laser in accordance with claim 2 in which the metal is aluminum and the layer is of magnesium oxide and at least 100 Angstroms thick.

8. A laser in accordance with claim 2 in which the metal is tantalum and the layer is tantalum oxide at least 100 Angstroms thick.

9. A laser in accordance with claim 4 in which the layer is at least 100 Angstroms thick.

10. A laser in accordance with claim 1 in which one wall of said waveguide is formed by a plurality of segments in which insulating segments alternate with metal segments.

11. A laser in accordance with claim 10 in which the insulating segments are of quartz, the side wall members are of quartz, and the other wall of said waveguide comprises a solid copper base member.

12. A laser in accordance with claim 10 in which the metal segments are of a metal taken from the group consisting of aluminum, magnesium and tantalum, and the segments include a surface layer of an insulator taken from the group consisting of aluminum oxide, magnesium oxide and tantalum oxide.

13. A laser in accordance with claim 12 in which the surface layer is at least 100 Angstroms thick.

14. A transverse excitation laser comprising
    means defining an optical axis along which the laser light propagates,
    electrode means positioned in opposed relationship along said optical axis for establishing therealong a transverse electric field, one of said electrode means being a solid base member and the other of said electrode means comprising a plurality of metallic segments, adjacent metallic segments being spaced apart by an interleaved plurality of insulating segments to form a continuous surface,
    insulating side wall members forming with said electrode means a waveguide for the laser light,
    a gaseous medium for flow in said waveguide in the transverse electric field, and
    means for exciting said medium to produce a population inversion and to stimulate the desired emission of radiation,
    characterized in that the exciting means includes a first voltage source for applying a relatively higher voltage pulse between the base member as anode and at least some of the metal segments as cathode for preionizing said medium and a second voltage source for applying a relatively lower voltage between said base member as cathode and at least some of the metal segments as anode for sustaining a discharge in said medium, the waveguide being free of other electrode means and opaque to the introduction of free electrons therein and the metal segments include an insulating surface layer for providing secondary electron emission for preionizing the medium.

15. A transverse excitation layer in accordance with claim 14 in which the waveguide is of rectangular cross-section.

16. A transverse excitation laser in accordance with claim 15 in which all the metal segments are connected to serve as cathode during preionization and as anode during the sustaining phase.

17. A transverse-excitation laser in accordance with claim 15 in which one set of alternate metal segments is connected to serve as cathode during preionizatiion and one set of different alternate electrodes is connected to serve as anode during the sustaining phase.

18. A transverse-excitation laser tube comprising means defining an optical waveguide including a metal base member forming one wall of the waveguide, a pair of spaced insulating members forming a pair of opposed side walls of the waveguide, and a composite member forming the fourth wall, said composite member comprising insulating segments and metallic segments alternating in the direction of waveguiding, each of the metallic segments including a surface portion having an insulating layer of a material taken from the group consisting of aluminum oxide, magnesium oxide, and tantalum oxide of a thickness at least 100 Angstroms,
    means for flowing gas along the waveguide
    and electrode means for establishing operating voltages on the base member and the metallic segments.

19. A transverse-excitation laser tube in accordance with claim 18 in which the base member is copper, the side walls are quartz, the insulating segments are quartz, and the metallic segments are of a metal taken from the group consisting of aluminum and tantalum.

20. A transverse-excitation laser tube in accordance with claim 19 in which the waveguide defined by the four walls is free of any obstruction to laser light along the path of flow of the active gas medium.

* * * * *